(12) United States Patent
Saito

(10) Patent No.: US 7,062,167 B2
(45) Date of Patent: Jun. 13, 2006

(54) OPTICAL TRANSMISSION SYSTEM, MONITORING METHOD THEREFOR, OPTICAL COMMUNICATION APPARATUS, AND OPTICAL EXTERNAL CONDUCTING APPARATUS

(75) Inventor: Takashi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 09/938,735

(22) Filed: Aug. 27, 2001

(65) Prior Publication Data

US 2002/0024692 A1 Feb. 28, 2002

(30) Foreign Application Priority Data

Aug. 30, 2000 (JP) ............................. 2000-260047

(51) Int. Cl.
*H04B 10/08* (2006.01)
(52) U.S. Cl. ........................................ 398/33
(58) Field of Classification Search ................ 398/9–38
See application file for complete search history.

(56) References Cited

U.S. PATENT DOCUMENTS 4,736,464 A * 4/1988 Tanson ....................... 398/176
5,130,836 A * 7/1992 Kaharu et al. ............... 398/33
5,218,465 A * 6/1993 Lebby et al. ................ 398/19
5,442,472 A * 8/1995 Skrobko ......................... 398/9
6,317,055 B1* 11/2001 Fujisawa ..................... 340/850
6,335,810 B1* 1/2002 Uehara ......................... 398/48

FOREIGN PATENT DOCUMENTS

| JP | 4-79549 | 3/1992 |
| JP | 07-38506 | 2/1995 |
| JP | 7-38506 | 2/1995 |

* cited by examiner

*Primary Examiner*—David C. Payne
(74) *Attorney, Agent, or Firm*—Foley & Lardner LLP

(57) ABSTRACT

To provide an optical transmission system that enables monitoring of communication data to be performed without interrupting operation. Optical signals to be transmitted by an optical communication apparatus and optical signals received by the optical communication apparatus are branched by optical fiber couplers respectively, and these branched optical signals are transmitted to transmit interfaces provided beforehand in the optical communication apparatus. Monitoring of the data contents of transmitted and received optical signals is performed by connecting these transmit interfaces to monitors, respectively.

7 Claims, 4 Drawing Sheets

OPTICAL TRANSMISSION SYSTEM, MONITORING METHOD THEREFOR, OPTICAL COMMUNICATION APPARATUS, AND OPTICAL EXTERNAL CONDUCTING APPARATUS

BACKGROUND OF THE INVENTION

1. Field of the Invention

The present invention relates to an optical transmission system, monitoring method therefor, an optical communication apparatus, and an optical external conducting apparatus, and relates in particular to an optical transmission system, monitoring method therefor, an optical communication apparatus, and an optical external conducting apparatus, whereby it is possible to perform monitoring of optical signals transmitted and received between the optical communication apparatus and its communicating party.

2. Description of the Related Art

With a multi-access system such as a bus-structure LAN, it is easy to monitor communication data with a monitor via a repeater or the like.

However, with a point-to-point communication method such as ATM (Asynchronous Transfer Mode) communication, for example, it is difficult to use a similar method. Thus, communication data is usually monitored by inserting a monitor that has two sets of transmit/receive ports between the communicating apparatuses.

FIG. 5 is a block diagram of the configuration of a conventional optical transmission system. In FIG. 5, when monitoring of communication data transmitted and received between a communication apparatus 100 and a communication apparatus 200 is performed, a monitor 300 which has a transmit/receive port 400 and a transmit/receive port 500 is inserted between the communication apparatus 100 and the communication apparatus 200.

Then, data transmitted from the communication apparatus 100 is displayed on a display unit 600 and data transmitted from the communication apparatus 200 is displayed on a display unit 700. By this means, it is possible to perform monitoring of communication data transmitted and received between the communication apparatus 100 and the communication apparatus 200.

Also, another conventional technology is the optical transmission system disclosed in Japanese Patent Laid-Open No. 7-38506. The above described publication describes an optical transmission system whereby an optical signal input to the optical fiber amplifier of an optical repeater is branched by an optical coupler, the optical level of this branched optical signal is monitored, and an alarm signal is sent out if the level falls below a predetermined value.

However, in the optical transmission system shown in FIG. 5, the monitor is expensive, and therefore the monitor 300 is normally connected only if a problem occurs in communication between the communication apparatus 100 and the communication apparatus 200. A disadvantage of this is that, in order to connect the monitor 300, it is necessary to connect/disconnect optical fibers during operation and it is unavoidable to interrupt the operation.

Also, in the optical transmission system disclosed in the above described publication, the optical level is monitored, and this system thus has the disadvantage of not being able to handle cases where a fault cannot be judged by the optical level alone, such as when the optical level of the optical signal is normal but there is a problem with the data level.

SUMMARY OF THE INVENTION

It is a first object of the present invention to provide an optical transmission system, monitoring method therefor, an optical communication apparatus, and an optical external conducting apparatus, whereby it is possible to perform monitoring of communication data without interrupting operation.

It is a second object of the present invention to provide an optical transmission system, monitoring method therefor, an optical communication apparatus, and an optical external conducting apparatus, whereby it is possible to judge a fault that cannot be judged simply by monitoring the optical level.

An optical transmission system according to the present invention comprises an optical communication apparatus, a communicating party of the above described optical communication apparatus, and a monitor for performing monitoring of optical signals transmitted and received between the above described optical communication apparatus and the above described communicating party; wherein the above described optical communication apparatus comprises optical branching means for branching optical signals to be transmitted to the above described communicating party and optical signals received from the above described communicating party, and conducting means for conducting the above described optical signals to be transmitted and the above described received optical signals that have been branched by the above described optical branching means, to the above described monitor; and wherein the above described monitor performs monitoring of the data contents of the above described optical signals to be transmitted and the above described received optical signals that have been conducted from the above described conducting means.

Also, in the above described optical transmission system, the above described conducting means comprises a first transmit interface for conducting to the above described monitor the above described optical signals to be transmitted and a second transmit interface for conducting to the above described monitor the above described received optical signals, and the above described monitor consists of two mutually independent monitors: a monitor for performing monitoring of the data contents of the above described optical signals to be transmitted that have been conducted from the above described first transmit interface, and a monitor for performing monitoring of the data contents of the above described received optical signals that have been conducted from the above described second transmit interface.

Another optical transmission system according to the present invention comprises an optical communication apparatus, a communicating party of the above described optical communication apparatus, and a monitor for performing monitoring of optical signals transmitted and received between the above described optical communication apparatus and the above described communicating party; the above described optical transmission system comprising an optical external conducting apparatus, located between the above described optical communication apparatus and the above described communicating party, that includes optical branching means for branching the above described optical signals, and conducting means for conducting the above described optical signals that have been branched by the above described optical branching means, to the above described monitor; wherein the above described monitor performs monitoring of the data contents of the above described optical signals that have been conducted from the above described conducting means.

Also, in the above described optical transmission system, the above described conducting means comprises a first transmit interface for conducting optical signals transmitted by the above described optical communication apparatus from among the above described branched optical signals, to the above described monitor, and a second transmit interface for conducting optical signals transmitted by the above described communicating party from among the above described branched optical signals, to the above described monitor, and the above described monitor consists of two mutually independent monitors: a monitor for performing monitoring of the data contents of optical signals transmitted by the above described optical communication apparatus that have been conducted from the above described first transmit interface, and a monitor for performing monitoring of the data contents of optical signals transmitted by the above described communicating party that have been conducted from the above described second transmit interface.

A monitoring method according to the present invention is a monitoring method for an optical transmission system comprising an optical communication apparatus, a communicating party of the above described optical communication apparatus, and an external monitor for performing monitoring of optical signals transmitted and received between the above described optical communication apparatus and the above described communicating party; the above described monitoring method comprising, in the above described optical communication apparatus, an optical branching step of branching optical signals to be transmitted to the above described communicating party and optical signals received from the above described communicating party, and a conducting step of conducting the above described optical signals to be transmitted and the above described received optical signals that have been branched by the above described optical branching step, to the above described external monitor, and, in the above described monitor, a monitoring step of performing monitoring of the data contents of the above described optical signals to be transmitted and the above described received optical signals that have been conducted from the above described conducting step.

Another monitoring method according to the present invention is a monitoring method for an optical transmission system comprising an optical communication apparatus, a communicating party of the above described optical communication apparatus, and an external monitor for performing monitoring of optical signals transmitted and received between the above described optical communication apparatus and the above described communicating party; the above described monitoring method comprising, in an optical external conducting apparatus located between the above described optical communication apparatus and the above described communicating party, an optical branching step of branching the above described optical signals, and a conducting step of conducting the above described optical signals that have been branched by the above described optical branching step, to the above described external monitor, and, in the above described monitor, a monitoring step of performing monitoring of the data contents of the above described optical signals that have been conducted by means of the above described conducting step.

An optical communication apparatus according to the present invention comprises optical branching means for branching optical signals to be transmitted to a communicating party and optical signals received from the above described communicating party, and conducting means for conducting the above described optical signals to be transmitted and the above described received optical signals that have been branched by the above described optical branching means, to a monitor that performs monitoring of optical signal data contents.

Also, in the above described optical communication apparatus, the above described conducting means comprises a first transmit interface for conducting to the above described monitor the above described optical signals to be transmitted, and a second transmit interface for conducting to the above described monitor the above described received optical signals, and the above described monitor consists of two mutually independent monitors: a monitor for performing monitoring of the data contents of the above described optical signals to be transmitted that have been conducted from the above described first transmit interface, and a monitor for performing monitoring of the data contents of the above described received optical signals that have been conducted from the above described second transmit interface.

An optical external conducting apparatus according to the present invention is located between an optical communication apparatus and its communicating party, and comprises optical branching means for branching optical signals transmitted and received between the above described optical communication apparatus and the above described communicating party, and conducting means for conducting the above described optical signals that have been branched by the above described optical branching means to a monitor for performing monitoring of the data contents of the above described optical signals.

Also, in the above described optical external conducting apparatus, the above described conducting means comprises a first transmit interface for conducting optical signals transmitted by the above described optical communication apparatus from among the above described branched optical signals, to the above described monitor, and a second transmit interface for conducting optical signals transmitted by the above described communicating party from among the above described branched optical signals, to the above described monitor, and the above described monitor consists of two mutually independent monitors: a monitor for performing monitoring of the data contents of optical signals transmitted by the above described optical communication apparatus that have been conducted from the above described first transmit interface, and a monitor for performing monitoring of the data contents of optical signals transmitted by the above described communicating party that have been conducted from the above described second transmit interface.

Moreover, in the above described optical transmission system, the above described monitoring method, the above described optical communication apparatus, and the above described optical external conducting apparatus, the above described data contents are signaling information necessary for data exchange.

The operation of the present invention is as follows. Within an optical communication apparatus, optical signals to be transmitted by the above described optical communication apparatus and optical signals received by the optical communication apparatus are branched by optical branching means, and these branched optical signals are transmitted to a transmit interface provided beforehand in this apparatus. Monitoring of the data contents of transmitted and received optical signals is implemented by connecting an external monitor to this transmit interface. Alternatively, within an optical external conducting apparatus located between an optical communication apparatus and its communicating party, optical signals transmitted by the optical communication apparatus and optical signals transmitted by the communicating party are branched by optical branching means, and these branched optical signals are transmitted to a transmit interface provided beforehand in this apparatus. Monitoring of the data contents of transmitted and received optical signals is implemented by connecting an external monitor to this transmit interface.

DESCRIPTION OF THE PREFERRED EMBODIMENTS

Figure 1:
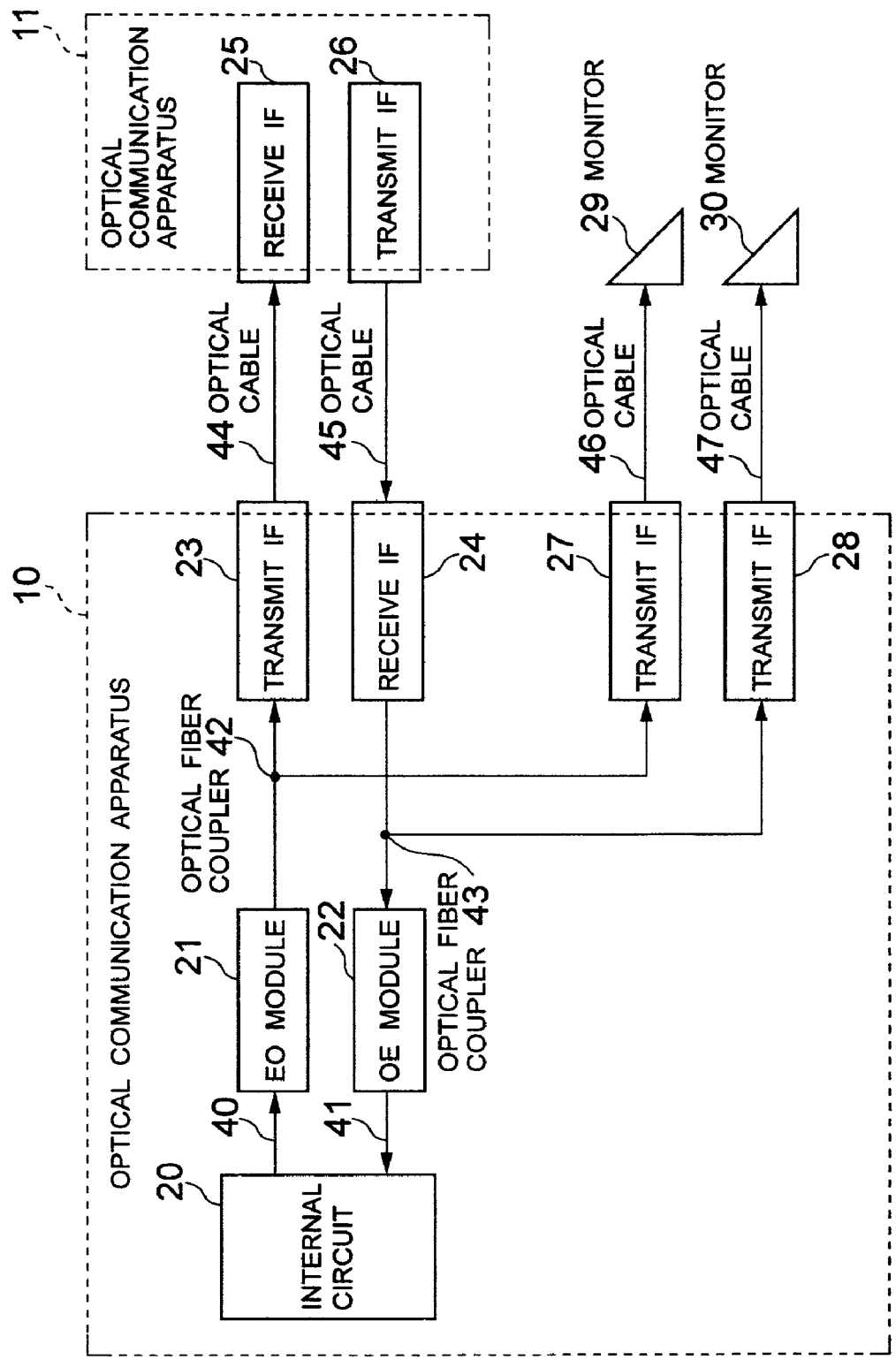
FIG. 1 is a block diagram showing the configuration of an optical transmission system according to an embodiment of the present invention.

With reference now to the attached drawings, embodiments of the present invention will be described below. FIG. 1 is a block diagram of the configuration of an optical transmission system according to an embodiment of the present invention.

In FIG. 1, an optical communication apparatus 10 has an internal circuit 20 that processes electrical signals, an EO (electro-optical conversion) module 21 that converts electrical signals to optical signals, an OE (opto-electrical conversion) module 22 that converts optical signals to electrical signals, an optical transmit IF (interface) 23 that conducts optical signals to an optical communication apparatus 11 that is the communicating party, an optical receive IF 24 that receives optical signals transmitted from the optical communication apparatus 11, an optical transmit IF 27 that conducts optical signals converted by the EO module 21 to a monitor 29, an optical transmit IF 28 that conducts optical signals received by the optical receive IF 24 to a monitor 30, an optical fiber coupler 42 that branches optical signals converted by the EO module 21 to the optical transmit IF 23 and the optical transmit IF 27, and an optical fiber coupler 43 that branches optical signals received by the optical receive IF 24 to the OE module 22 and the optical transmit IF 28.

Figure 2:
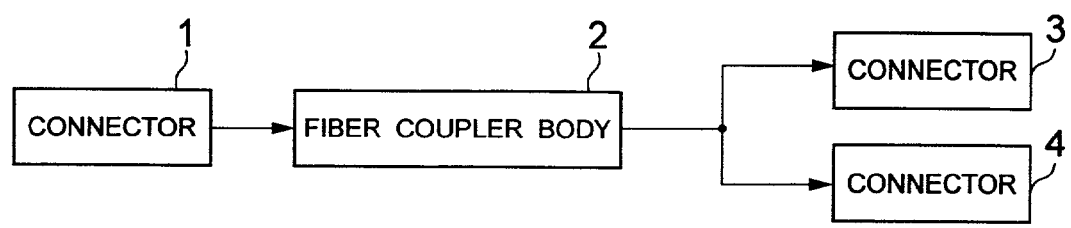
FIG. 2 is a block diagram showing the configuration of an optical fiber coupler.

Here, the optical fiber coupler is an optical fiber that branches light according to a branching ratio, such as 1:2, for example. FIG. 2 is a block diagram showing the configuration of the optical fiber coupler shown FIG. 1. In FIG. 2, the branching ratio can be freely changed in the manufacturing stage, and there are branching ratios of 50%:50%, 95%:5%, and so forth, with the attenuation factor varying according to the branching ratio. With a branching ratio of 95%:5%, light input to a connector 1 passes through the optical fiber coupler body 2, and is branched in the proportions 95% to a connector 3 and 5% to a connector 4.

In FIG. 1, the optical communication apparatus 11, which is the communicating party of the optical communication apparatus 10, has an optical receive IF 25 that receives optical signals transmitted from the optical communication apparatus 10, and an optical transmit IF 26 that transmits optical signals to the optical communication apparatus 10.

The transmit IF 23 of the optical communication apparatus 10 is connected to the receive IF 25 of the optical communication apparatus 11 via an optical cable 44, and the receive IF 24 of the optical communication apparatus 10 is connected to the transmit IF 26 of the optical communication apparatus 11 via an optical cable 45. A repeater apparatus or the like may also be inserted in the optical cables 44 and 45.

The monitor 29, which performs monitoring of optical signal data contents, is connected to the transmit IF 27 of the optical communication apparatus 10 via an optical cable 46, and the monitor 30, which performs monitoring of optical signal data contents, is connected to the transmit IF 28 of the optical communication apparatus 10 via an optical cable 47.

Figure 3:
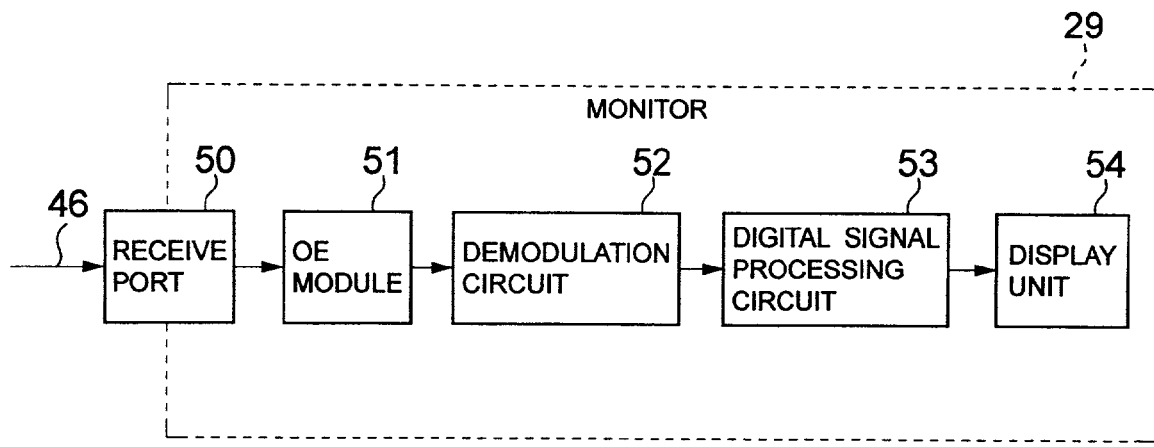
FIG. 3 is a block diagram showing the configuration of monitor 29 shown in FIG. 1.

FIG. 3 is a block diagram showing the configuration of the monitor 29. Parts that are the same as in FIG. 1 are denoted by the same reference numerals. In FIG. 3, the monitor 29 receives an optical signal sent via the optical cable 46 at a receive port 50. This signal is then converted to an electrical signal by an OE module 51. The electrical signal is demodulated by a demodulation circuit 52, and predetermined processing is performed by a digital signal processing circuit 53. A display unit 54 displays the data contents of the communication data. The configuration of the monitor 30 is also the same as that shown in FIG. 3.

The operation of the optical transmission system according to the embodiment of the present invention will be described below, taking the transmitting side and receiving side of the optical communication apparatus 10 separately. On the transmitting side, an electrical signal pattern 40 which is output from the internal circuit 20 is converted to an optical signal by the EO module 21. This optical signal is input to the optical fiber coupler 42 and transmitted externally via the transmit IF 23 from one of the outputs of the optical fiber coupler 42.

The optical signal transmitted from the transmit IF 23 is input to the receive IF 25 of the optical communication apparatus 11 via the optical cable 44. The optical signal converted by the EO module 21 is input to the transmit IF 27 via the other output of the optical fiber coupler 42.

The transmit IF 27 transmits the optical signal input via the other output of the optical fiber coupler 42 to the optical cable 46, and this optical signal is input to the monitor 29. The monitor 29 performs monitoring of the data contents of the input optical signal. Here, data contents are signaling information (information necessary for data exchange, such as start, response, end-of-call, and select signals). By viewing the monitoring results—that is, the display results—an observer can ascertain whether a fault has occurred.

If the optical power of the optical signal branched by the optical fiber coupler 42 is insufficient, an optical amplifier may be used before the monitor 29.

By measuring the optical power attenuation factor of the transmit IF 23 and transmit IF 27 beforehand, it is possible to estimate the optical power of the optical signal in the transmit IF 23.

On the receiving side, an optical signal transmitted from the transmit IF 26 of the optical communication apparatus 11 is received by the receive IF 24 via the optical cable 45. The received optical signal is input to the optical fiber coupler 43, and input to the OE module 22 via one of the outputs of the optical fiber coupler 43. The optical signal is converted to an electrical signal pattern 41 by the OE module 22. The electrical signal pattern 41 is input to the internal circuit 20.

The optical signal received by the receive IF 24 is input to the transmit IF 28 from the other output of the optical fiber coupler 43. The transmit IF 28 transmits the optical signal input via the other output of the optical fiber coupler 43 to the optical cable 47, and the monitor 30 receives this optical signal.

The monitor 30 performs monitoring of received optical signal signaling information in the same way as the monitor 29. By viewing the monitoring results, an observer can ascertain whether a fault has occurred.

If the optical power of the optical signal branched by the optical fiber coupler 43 is insufficient, an optical amplifier may be used before the monitor 30.

By measuring the optical power attenuation factor of the receive IF 24 and transmit IF 28 beforehand, it is possible to estimate the optical power of the optical signal in the receive IF 24.

Figure 5:
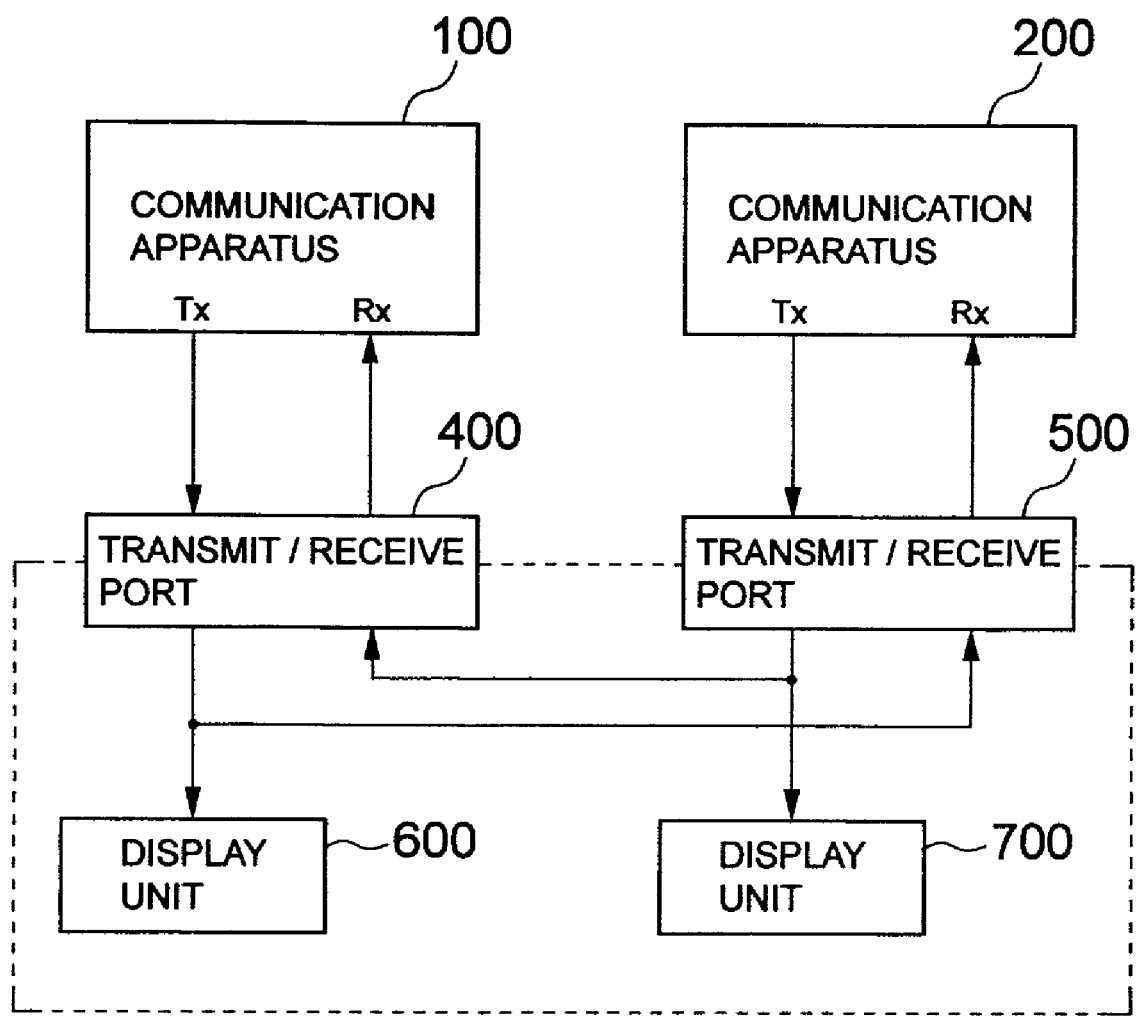
FIG. 5 is a block diagram showing the configuration of a conventional optical transmission system.

In the conventional optical transmission system shown in FIG. 5, the monitor 300 with two sets of transmit/receive ports is necessary, but in the optical transmission system according to this embodiment, it is sufficient to have the monitor 29 with one receive port, and one monitor 29 and one monitor 30 can be used independently.

Also, in this embodiment, monitoring is implemented by branching optical signals during operation, so that, unlike the case where electrical signals 40 and 41 are copied, or copying is performed within the internal circuit 20, it is easy to infer what kind of problem has occurred in an optical cable on which communication is being performed.

Figure 4:
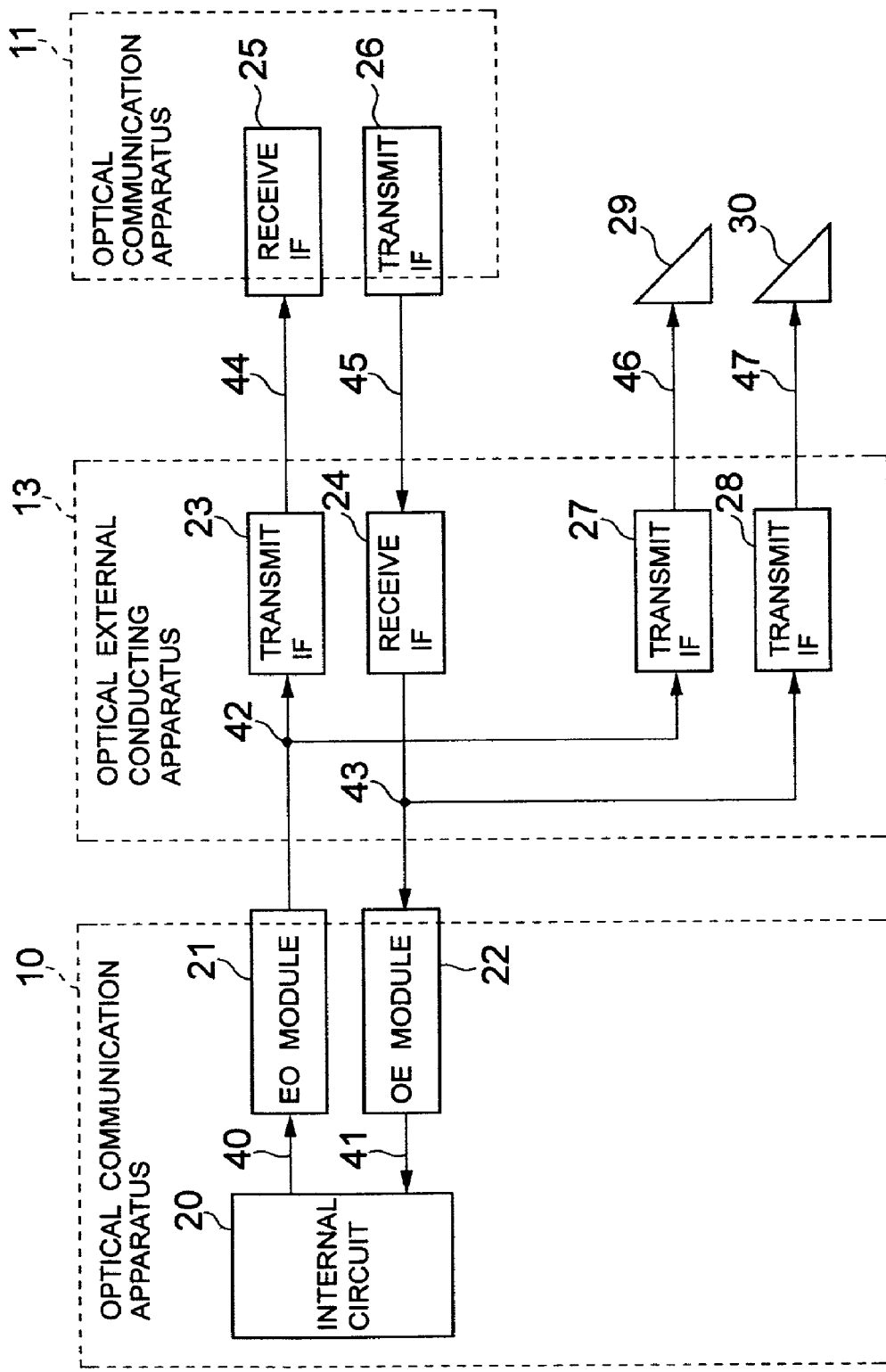
FIG. 4 is a block diagram showing the configuration of an optical transmission system according to another embodiment of the present invention.

Another embodiment of the present invention will now be described below with reference to the attached drawings. FIG. 4 is a block diagram showing the configuration of an optical transmission system according to another embodiment of the present invention. Parts that are the same as in FIG. 1 are denoted by the same reference numerals. FIG. 4 differs from FIG. 1 in that the transmit IF 23, 27, and 28, the receive IF 24, and the optical fiber couplers 42 and 43, are external to the optical communication apparatus 10, and form an optical external conducting apparatus 13.

That is to say, the optical external conducting apparatus 13 has the transmit IF 23, the transmit IF 27, the transmit IF 28, the receive IF 24, the optical fiber coupler 42, and the optical fiber coupler 43, and is located between the optical communication apparatus 10 and its communicating party, optical communication apparatus 11.

Monitoring of signaling information of optical signal is implemented by connecting the monitor 29 to the transmit IF 27 and connecting the monitor 30 to the transmit IF 28. It is clear that the same kind of effect can be achieved with this embodiment as with the optical transmission system in FIG. 1.

A first effect of the present invention is that monitoring of communication data can be performed without interrupting operation. This is because transmitted and received optical signals are branched within the optical communication apparatus, and the branched optical signals are input to a transmit interface provided beforehand in the optical communication apparatus, so that it is possible to perform monitoring by connecting a monitor to this transmit interface. Alternatively, transmitted and received optical signals are branched within an optical external conducting apparatus located between the optical communication apparatus and its communicating party, and these branched optical signals are input to a transmit interface provided beforehand in the optical external conducting apparatus, so that it is possible to perform monitoring by connecting a monitor to this transmit interface.

A second effect of the present invention is that it is possible to judge faults that cannot be judged simply by monitoring the optical level. This is because the optical signal data content (signaling information) is monitored rather than the optical level of optical signals.

What is claimed is:

1. An optical transmission system, comprising an optical communication apparatus, a communicating party of said optical communication apparatus, and a monitor device for performing monitoring of optical signals transmitted and received between said optical communication apparatus and said communicating party;

wherein said optical communication apparatus comprises:
an optical branching transmitting device having a single input and a first and second outputs, for branching input optical signals to be transmitted to said communicating party from the single input into first optical signals on the first output and second optical signals on the second output;
a first transmit interface coupled to receive said first optical signals from said optical branching transmitting device, said first transmit interface connected only to a single optical cable for transmitting said first optical signals to said communicating party;
a second transmit interface coupled to receive said second optical signals from said optical branching transmitting device and for transmitting said second optical signals to said monitor device;
a receive interface coupled to receive optical signals from said communicating party and providing received optical signals;
an optical branching receiving device having a single input and a first and second outputs, wherein said single input is connected to said receive interface for receiving said received optical signals and for branching said received optical signals into third and fourth optical signals respectively on the first and second outputs;
additional circuitry of said optical communicating apparatus connected to receive said third optical signals from said optical branching receiving device;
a third transmit interface connected to receive said fourth optical signals from said optical branching receiving device and for transmitting said fourth optical signals to said monitor device; wherein said monitor device includes a display and performs monitoring of data contents of said second and fourth optical signals.

2. The optical transmission system according to claim 1, wherein said monitor device comprises two mutually independent monitors each having a display unit: a monitor for performing monitoring of the data contents of said second optical signals and a monitor for performing monitoring of the data contents of said fourth optical signals.

3. The optical transmission system as recited in claim 1, wherein said additional circuitry of said optical communication apparatus is located remotely of said optical branching transmitting device, said optical branching receiving device, said first, second and third transmit interface and said receive interface.

4. The optical transmission system according to claim 1, wherein said data contents are signaling information necessary for data exchange.

5. A monitoring method for an optical transmission system comprising an optical communication apparatus, a communicating party of said optical communication apparatus, and an external monitor device for performing monitoring of optical signals transmitted and received between said optical communication apparatus and said communicating party, comprising:

in said optical communication apparatus, a transmitting optical branching step of branching a single output of optical signals to be transmitted to said communicating party into first and second optical signals;

a first interface transmitting step of transmitting said first optical signals received as a result of said transmitting branching step to said communicating party along only a single optical cable;

a second interface transmitting step of transmitting said second optical signals received from said first transmitting branching step to said monitor device;

an interface receiving step of receiving optical signals from said communication party;

a receiving optical branching step of branching a single input of optical signals received from said interface receiving step into third and fourth optical signals;

an additional receiving step of receiving said third optical signals into additional circuitry of said optical communication apparatus;

a third interface transmitting step of transmitting said fourth optical signal to said monitor device; and in said monitor device, a monitoring step of performing monitoring of the data contents of said second and fourth optical signals and displaying the data contents on a display.

6. The monitoring method as recited in claim 5, wherein said first interface transmitting step, said second interface transmitting step, said interface receiving step, said receiving optical branching step and said third interface transmitting step are performed in an optical external conducting apparatus remote from remaining parts of said optical communication apparatus.

7. The monitoring method according to claim 5, wherein said data contents are signaling information necessary for data exchange.

* * * * *